(12) United States Patent
Ketcham et al.

(10) Patent No.: US 9,527,701 B2
(45) Date of Patent: Dec. 27, 2016

(54) DUAL DRIVE WINCH AND NUCLEAR REACTOR VESSEL MAINTENANCE APPARATUS EMPLOYING SAME

(75) Inventors: David P. Ketcham, Charlotte, NC (US); Stafford L. Turner, Ooltewah, TN (US); Robert T. Fells, Gadsden, AL (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1863 days.

(21) Appl. No.: 12/774,880

(22) Filed: May 6, 2010

(65) Prior Publication Data

US 2011/0274231 A1  Nov. 10, 2011

(51) Int. Cl.
*G21C 19/00* (2006.01)
*B66D 1/26* (2006.01)
*G21C 19/10* (2006.01)
*G21C 19/20* (2006.01)

(52) U.S. Cl.
CPC .............. *B66D 1/26* (2013.01); *G21C 19/10* (2013.01); *G21C 19/207* (2013.01)

(58) Field of Classification Search
USPC ..... 376/260, 268, 271; 74/15; 254/281, 284, 254/289, 292, 294, 298, 299, 304, 359, 387; 414/146; 104/183; 192/34
See application file for complete search history.

(56) References Cited

U.S. PATENT DOCUMENTS

| | | | | |
|---|---|---|---|---|
| 2,914,929 A * | 12/1959 | Irons | | 464/157 |
| 3,811,340 A * | 5/1974 | Morse | | 474/58 |
| 3,973,755 A * | 8/1976 | Fawcett | | 254/354 |
| 4,022,432 A | 5/1977 | Toyomura et al. | | |
| 4,024,935 A | 5/1977 | Sugimoto | | |
| 4,029,297 A | 6/1977 | Mounsdon | | |
| 4,033,554 A | 7/1977 | Sugimoto et al. | | |
| 4,088,304 A | 5/1978 | Gradert | | |
| 4,216,942 A | 8/1980 | Takamatsu et al. | | |
| 4,389,799 A | 6/1983 | Norton et al. | | |
| 4,432,532 A | 2/1984 | Overholt | | |
| 4,511,531 A | 4/1985 | Swidwa et al. | | |
| 4,555,092 A | 11/1985 | Overholt | | |
| 4,647,424 A | 3/1987 | Meuschke et al. | | |
| 4,786,460 A * | 11/1988 | Jacquelin et al. | | 376/270 |
| 5,069,863 A * | 12/1991 | Meuschke et al. | | 376/270 |
| 5,394,967 A * | 3/1995 | Bigley | | 192/69.4 |
| 6,029,952 A | 2/2000 | Huggett et al. | | |
| 7,484,713 B1 | 2/2009 | Young | | |
| 2008/0191182 A1* | 8/2008 | Arzberger et al. | | 254/297 |

* cited by examiner

*Primary Examiner* — Marshall O'Connor
(74) *Attorney, Agent, or Firm* — Richard J. Coldren; Westinghouse Electric Company LLC

(57) ABSTRACT

A dual drive winch having a drive assembly having a first shaft that is selectively movable between a first engaged position and a first disengaged position, and a second shaft that is selectively movable between a second engaged position and a second disengaged position. When the first shaft is in the first engaged position and the second shaft is in the second engaged position simultaneously, rotation of either the first shaft or the second shaft will, through a coupling mechanism, cause rotation of the other of the first shaft and the second shaft.

19 Claims, 8 Drawing Sheets

DUAL DRIVE WINCH AND NUCLEAR REACTOR VESSEL MAINTENANCE APPARATUS EMPLOYING SAME

BACKGROUND OF THE INVENTION

1. Field of the Invention

The present invention relates winch mechanisms, and in particular to a dual drive winch mechanism and a maintenance apparatus for use in servicing components of a nuclear reactor vessel, such as a control rod drive mechanism (CRDM), employing such a winch mechanism.

2. Related Art

In a Boiling Water Reactor (BWR) type nuclear reactor, a number control blades are provided within the reactor vessel, each control blade being positioned between a number of (e.g., four) nuclear fuel bundles. The power output of a BWR is controlled by the elevation position of the control blades within the fuel bundles. The position of each control blade is controlled by a control rod drive mechanisms (CRDM), which selectively raises and lowers the control blade within the BWR vessel.

At times, problems may arise with the operation of a CRDM. Some problems are severe and require replacement of the entire CRDM, which is an involved and time consuming process. Certain problems, however, such as leaking from the CRDM bolt-in location at the bottom of the reactor vessel, are less severe and merely require visual inspection and/or replacement of a minor part, such as an O-ring. In these less severe instances, it is only necessary to lower the CRDM to a position below the reactor vessel so that it can be inspected and/or so the problem part can be fixed or removed and replaced.

There is thus a need for an apparatus that simplifies and facilitates the lowering of CRDMs or other components in nuclear reactor vessels such as BWRs in order to facilitate inspection and/or maintenance of such components.

SUMMARY OF THE INVENTION

According to one embodiment of the invention, a dual drive winch assembly is provided that includes a first winch drum, a second winch drum, and a drive assembly. The drive assembly includes a first drive shaft assembly having a first shaft, the first drive shaft assembly being operatively coupled to the first winch drum for driving the first winch drum, a second drive shaft assembly having a second shaft, the second drive shaft assembly being operatively coupled to the second winch drum for driving the second winch drum, and a coupling mechanism. The first shaft is selectively movable within the first drive shaft assembly between a first engaged position wherein the first shaft is coupled to the coupling mechanism and a first disengaged position wherein the first shaft is not coupled to the coupling mechanism, and the second shaft is selectively movable within the second drive shaft assembly between a second engaged position wherein the second shaft is coupled to the coupling mechanism and a second disengaged position wherein the second shaft is not coupled to the coupling mechanism. When the first shaft is in the first engaged position and the second shaft is in the second engaged position simultaneously, rotation of either the first shaft or the second shaft will, through the coupling mechanism, cause rotation of the other of the first shaft and the second shaft.

In another embodiment, a nuclear reactor maintenance apparatus for selectively raising and lowering a component of the nuclear reactor is provided that includes an interface assembly coupled to the component, a first cable and a second cable each coupled to the interface assembly, the first and second cables being structured to support the component during the raising and lowering of the component, and a winch assembly as just described for paying out and reeling in either or both of the cables.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

A further understanding of the invention can be gained from the following description of the preferred embodiments when read in conjunction with accompanying drawings in which.

DESCRIPTION OF THE PREFERRED EMBODIMENT

Figure 1:
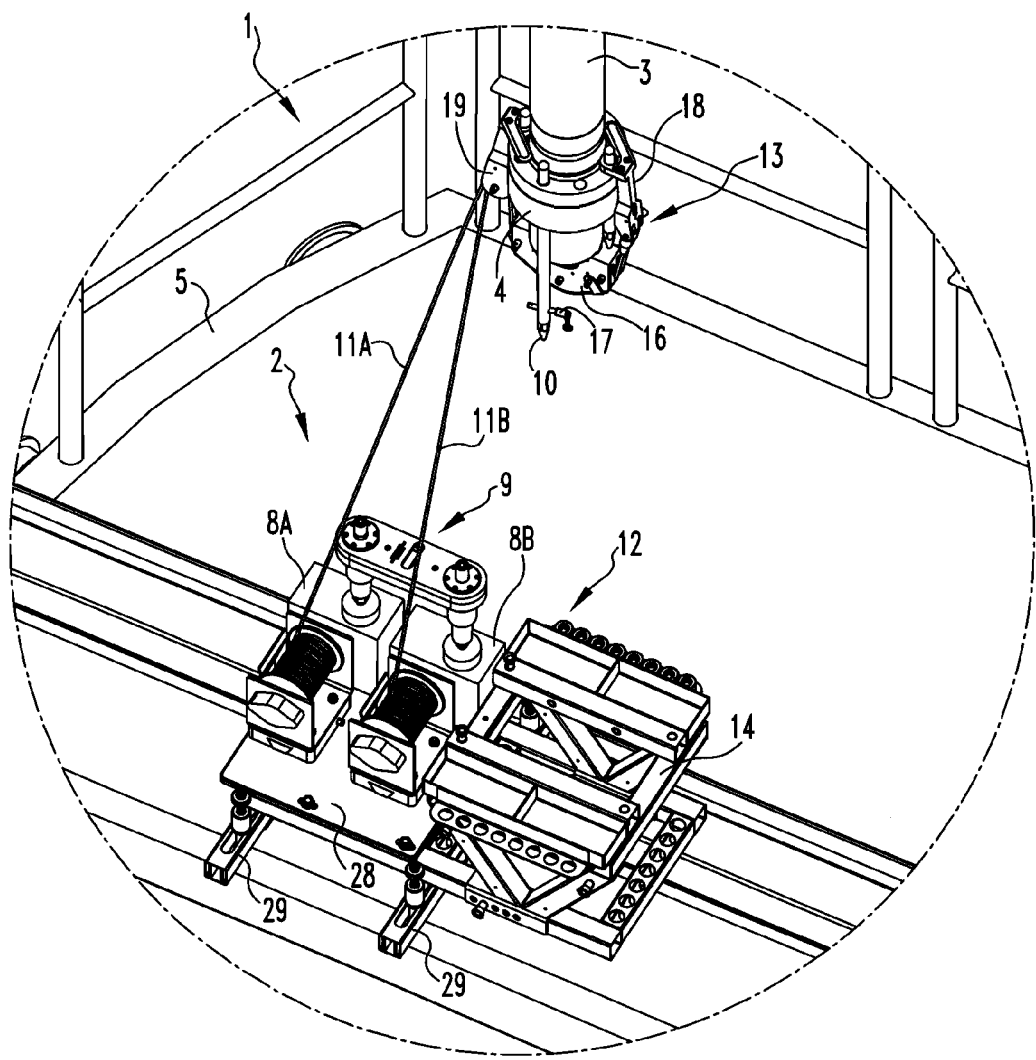
FIG. 1 is a schematic diagram of an under vessel area of a BWR showing a maintenance apparatus according to an exemplary embodiment of the invention which may be used to support and lower a CRDM for maintenance purposes.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

FIG. 1 is a schematic diagram of an under vessel area 1 including under vessel platform 5 of a BWR showing maintenance apparatus 2 according to an exemplary embodiment of the invention which may be used to support and lower a CRDM 4 for maintenance purposes. In a BWR, the reactor vessel has a bottom head that houses a number of CRDM guide tubes 3, each of which houses a respective CRDM 4. In FIG. 1, for clarity, only one CRDM guide tube 3 and one CRDM 4 is shown, although it will be understood that in a typical BWR vessel, there are a plurality of such CRDM guide tubes 3 and CRDMs 4. Each CRDM 4 is held in place by a number of bolts at a flange to flange connection between the CRDM guide tube 3 and the CRDM 4.

Figure 2:
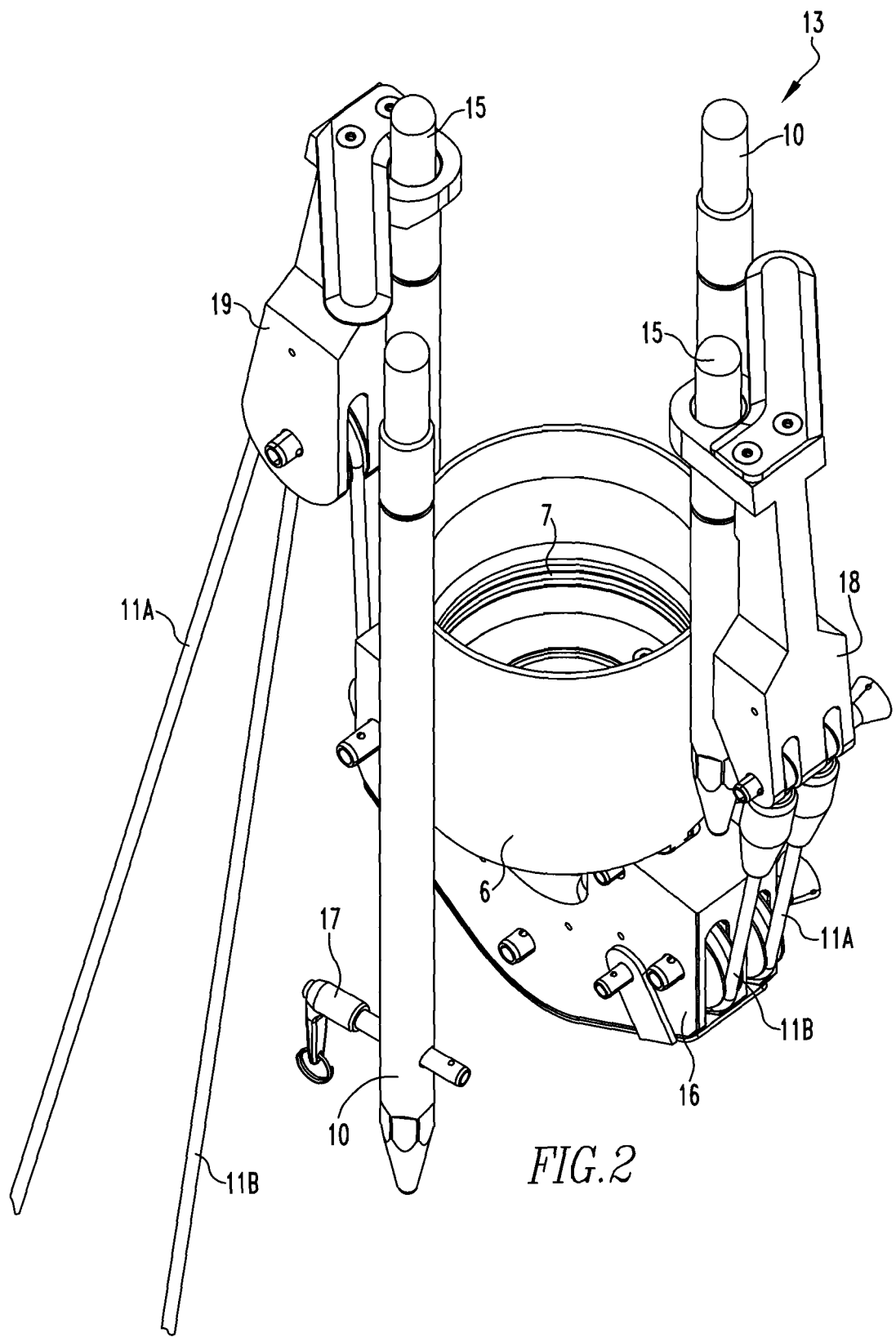
FIG. 2 is an isometric view of an interface assembly forming a part of the maintenance apparatus of FIG. 1 according to an exemplary embodiment of the invention.
Figure 3:
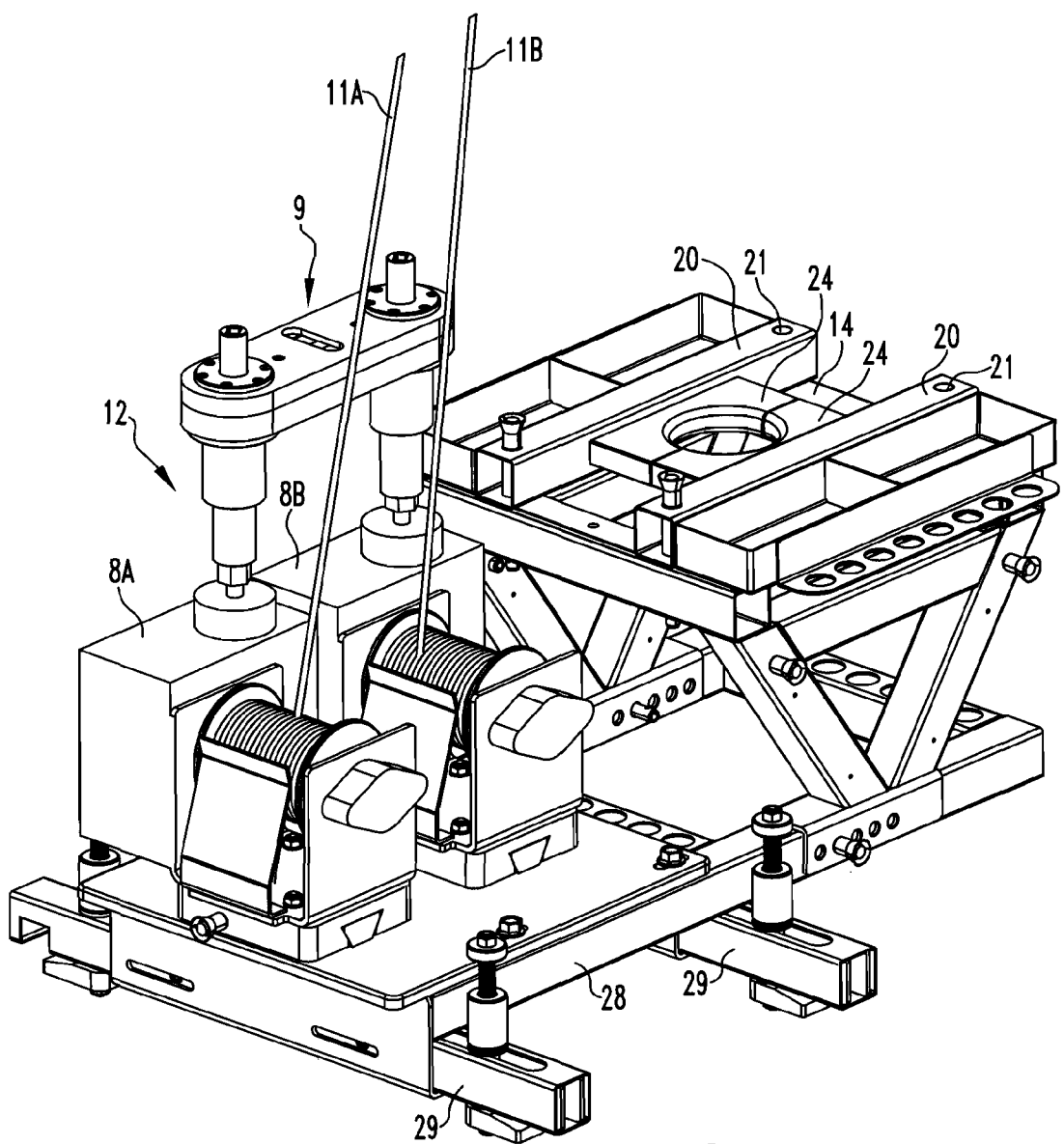
FIG. 3 is an isometric view of a winch assembly 12 forming a part of the maintenance apparatus of FIG. 1 according to an exemplary embodiment of the invention.

As seen in FIG. 1, maintenance apparatus 2 includes winch assembly 12, interface assembly 13 and cables 11A, 11B extending between winch assembly 12 and interface assembly 13. FIG. 2 is an isometric view of interface assembly 13, and FIG. 3 is an isometric view of winch assembly 12. As described in greater detail below, interface assembly 13 couples maintenance apparatus 2 to CRDM 4, and, once such coupling is complete, winch assembly 12 and cables 11A, 11B raise and lower CRDM 4.

Referring to FIG. 2, interface assembly 13 includes cylindrical bucket 6 having seal ring 7 provided within the lower end thereof. Bucket 6 is coupled to and provided on top of cable turning block 16. Interface assembly 13 further includes guide pins 10 having captive pins 17, guide pins 15, dead end assembly 18 and sheave block assembly 19, the functions of which are described below.

Referring to FIG. 3, winch assembly 12 includes first winch 8A which is operatively coupled to cable 11A and second winch 8B which is operatively coupled to cable 11B. Winches 8A and 8B are driven by drive assembly 9, which is described in greater detail herein. Winch assembly 12 further includes CRDM support frame 14 for supporting CRDM 4 when it is lowered for maintenance. Winches 8A and 8B and CRDM support frame 14 are mounted and supported on main support frame 28. Main support frame 28 functions as an under vessel interface and is structured to be attached to under vessel platform 5 by adjustable clamps 29 forming a part thereof.

Operation of maintenance apparatus 2 will now be described. First, four of the bolts which are used in the flange to flange connection between CRDM guide tube 3 and CRDM 4 are removed and replaced with guide pins 10 and 15, which are threaded into the flange of CRDM guide tube 3 (FIG. 1). Guide pins 10 and 15 allow for precise positioning when returning CRDM 4 to its operational position. Next, sheave block assembly 19 is installed onto one guide pin 15 and dead end assembly 18 is installed onto the other guide pin 15. Bucket 6 is then installed onto CRDM 4 and held in place by seal rings 7. Next, cable turning block 16 is installed onto bucket 6, and cables 11A, 11B are then attached to dead end assembly 18 and fed through cable turning block 16 and sheave block assembly 19. Cables 11A, 11B are then lead down and attached to winches 8A and 8B, respectively. Winches 8A and 8B are driven by drive assembly 9 in a first direction in order to take up the slack in cables 11A and 11B. As described in greater detail elsewhere herein, winches 8A and 8B may be driven by drive assembly 9 either together or independently (wherein one winch 8A, 8B is disengaged from drive assembly 9). The latter may be done to help control any potential problem with slack in cables 11A and 11B.

CRDM 4 is now ready for lowering, the remaining bolts coupling CRDM 4 to CRDM guide tube 3 and holding CRDM 4 in place are removed, thereby transferring the load of CRDM 4 to cables 11A and 11B. Captive pins 17 thru pins 10 are a safeguard prior to lowering the CRDM 4 after unbolting it. Captive pins 17 are removed and drive 9 (powered by an air wrench coupled to one of the shafts 54 thereof; see detailed description below) is energized to payout cables 11A and 11B, which allows CRDM 4 to be lowered. CRDM 4 is lowered to CRDM support frame 14 and is allowed to rest on arms 20 of CRDM support frame 14. CRDM 4 is then raised slightly and arms 20 are swung to either side via pins 21. Center guides 24 are then installed into arms 20. CRDM 4 is lowered below arms 20, and arms 20 are then swung back into position capturing the upper part of CRDM 4 (above the lower flange) therebetween, thus stabilizing CRDM 4 for the remainder of its lowering cycle.

Figure 4:
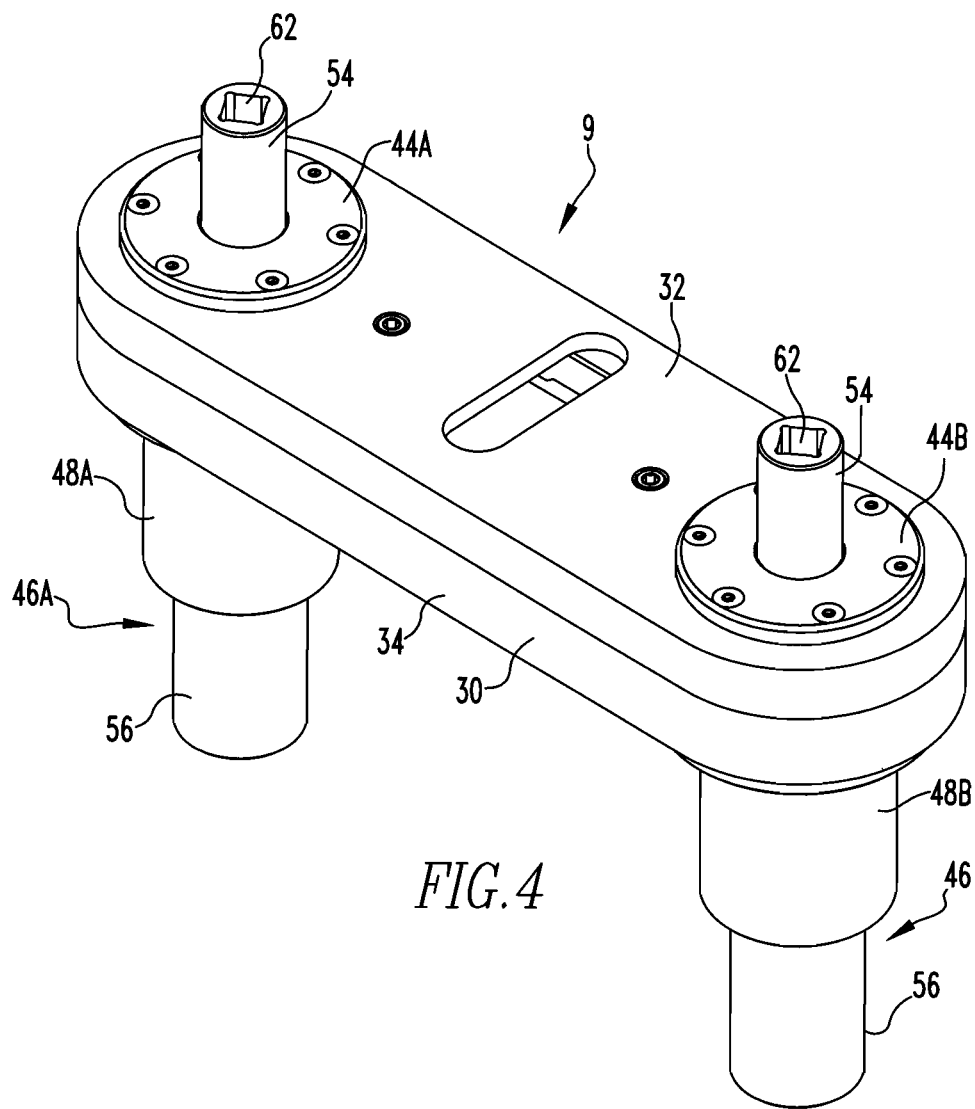
FIG. 4 is an isometric view.
Figure 5:
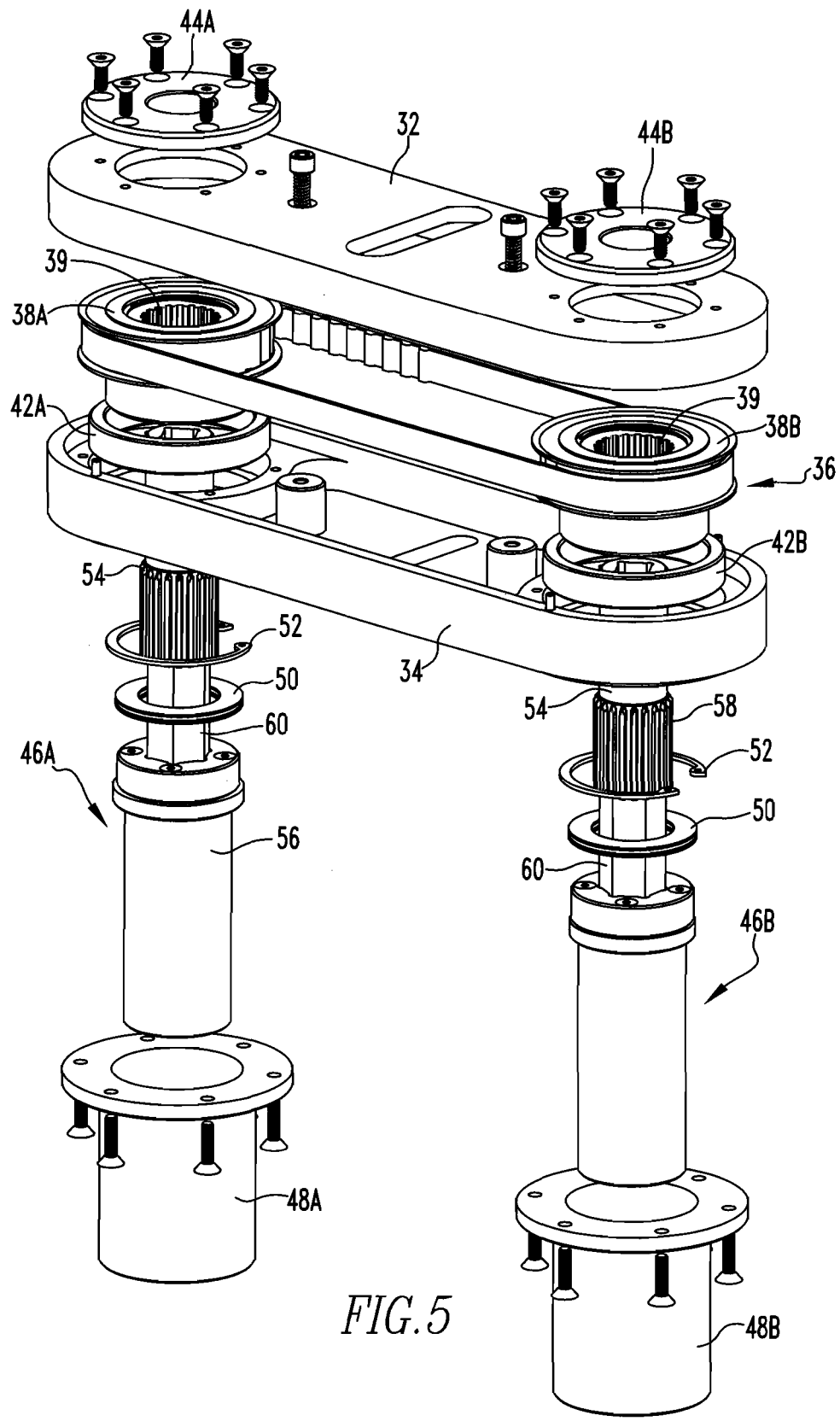
FIG. 5 is an exploded view and FIG. 6 is a cross-sectional view of a drive assembly forming a part of the maintenance apparatus of FIG. 1 according to an exemplary embodiment of the invention.
Figure 6:
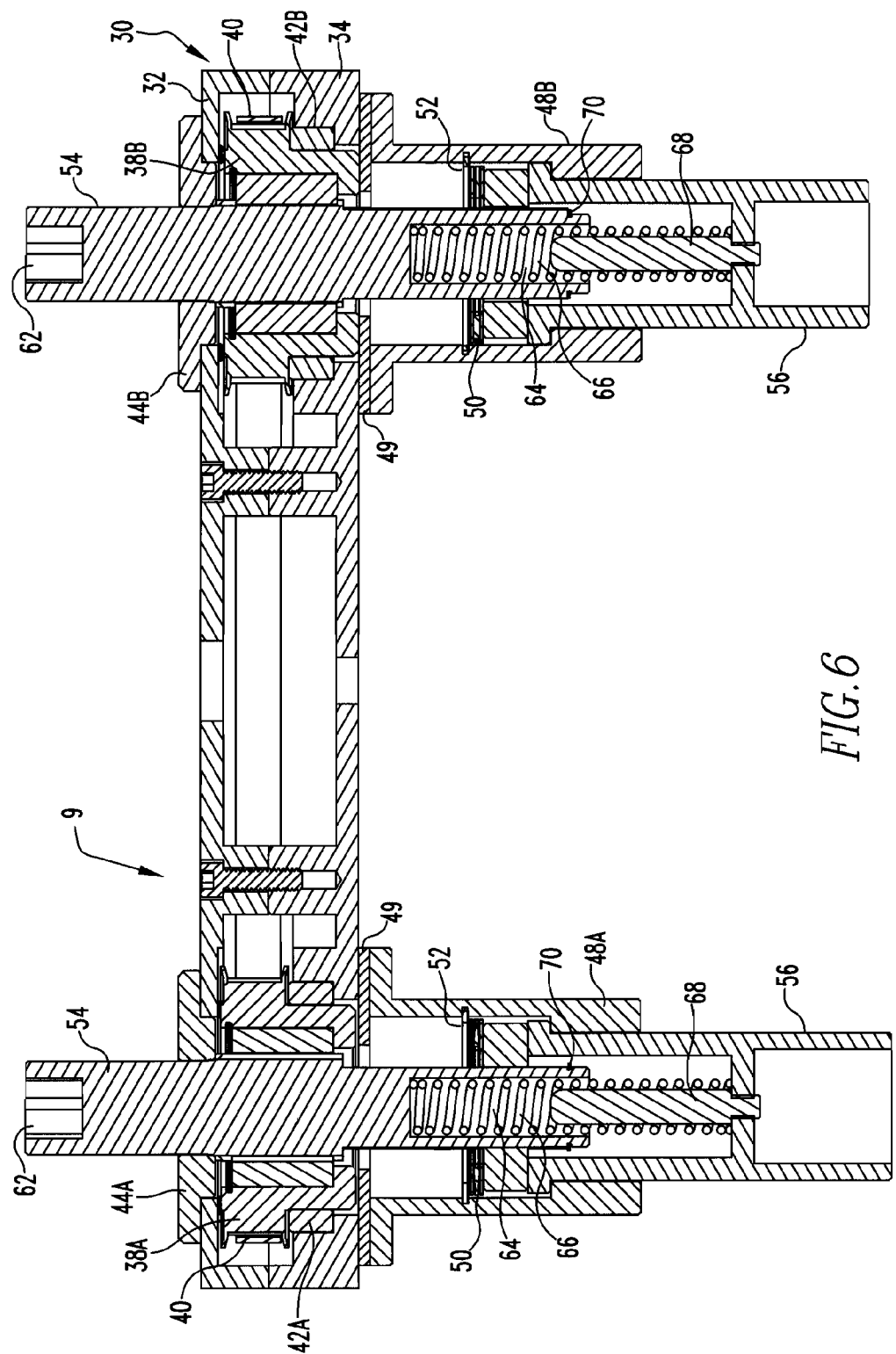
Figure 7:
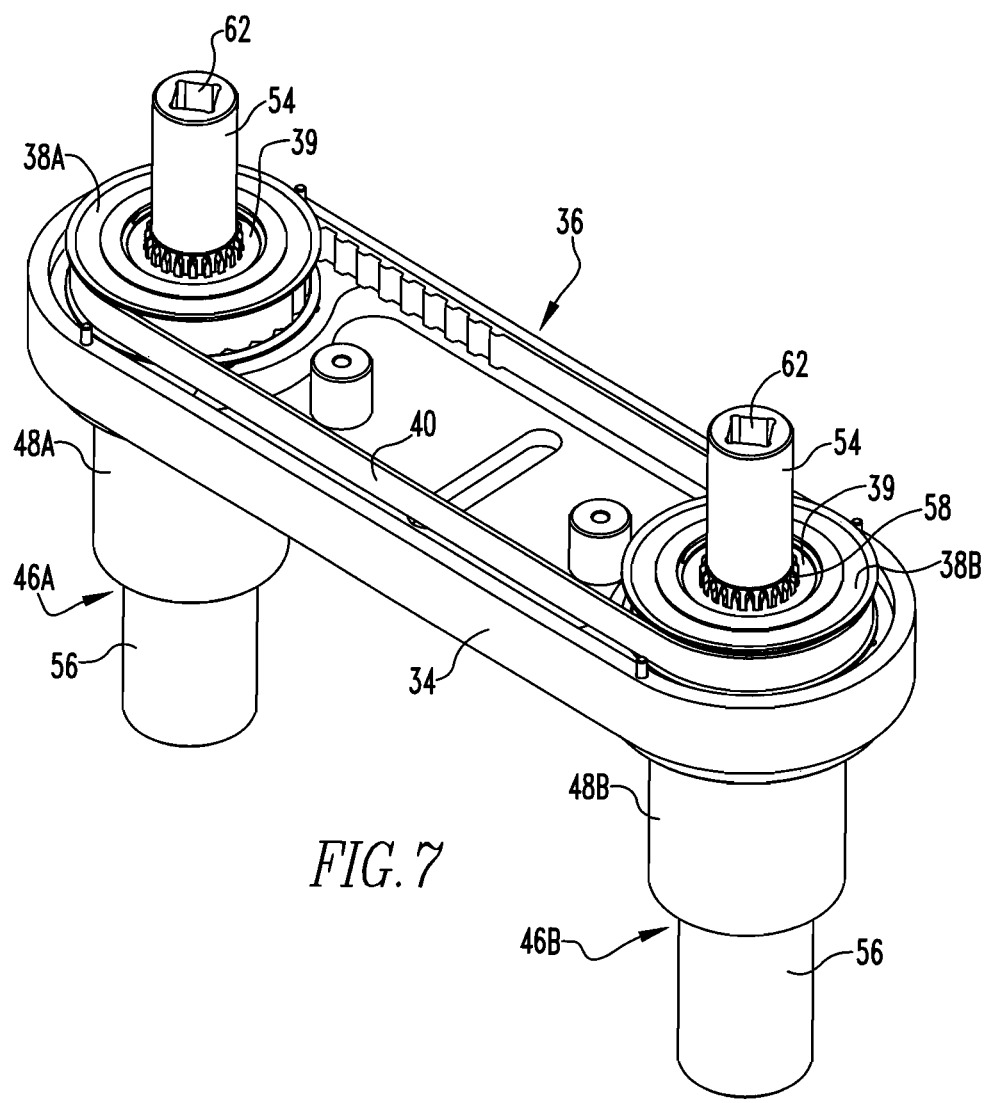
FIG. 7 is an isometric view of the drive assembly of FIGS. 4, 5 and 6 wherein its cover has been removed.

FIG. 4 is an isometric view, FIG. 5 is an exploded view and FIG. 6 is a cross-sectional view of drive assembly 9 according to an exemplary embodiment of the invention. Drive assembly 9 includes housing 30 that includes cover 32 and lower housing piece 34. FIG. 7 is an isometric view of drive assembly 9 wherein cover 32 has been removed.

Drive assembly 9 further includes belt and pulley system 36 that is housed within housing 30. In particular, belt and pulley system 36 includes pulley assemblies 38A and 38B that are coupled to one another by timing belt 40. As seen in FIGS. 5 and 7, each pulley assembly 38A, 38B comprises an internal component 39 that includes an internal spline structure, the purpose of which is described elsewhere herein. Bushings 42A and 42B are mounted into lower housing unit 34, and pulley assemblies 38A and 38B are rotatably mounted in bushings 42A, 42B, respectively. In addition, pulley assemblies 38A and 38B are axially restrained by bushings 42A and 42B and alignment disks 44A and 44B attached to cover 32.

Drive assembly 9 also includes drive shaft assemblies 46A and 46B. Drive sleeves 48A and 48B and associated spacers 49 are attached to lower housing piece 34. Drive shaft assemblies 46A and 46B are rotatably installed into drives sleeves 48A and 48B, respectively, and each is axially restrained by an associated thrust bearing 50 and snap ring 52 and an internal step in provided within the associated drive sleeve 48A, 48B.

Each drive shaft assembly 46A and 46B includes a shaft 54 and a hex housing 56 that receives and holds the shaft 54 as described below. Each shaft 54 includes an external spline portion 58, a hex shaped portion 60 and a recess 62 provided in the top surface of shaft 54. As seen in FIG. 7, the shaft 54 of drive shaft assembly 46A is received through pulley assembly 38A in a manner wherein the external spline 58 of the shaft 54 is received in the internal spline of the pulley assembly 38A. Similarly, the shaft 54 of drive shaft assembly 46B is received through pulley assembly 38B in a manner wherein the external spline 58 of the shaft 54 is received in the internal spline of the pulley assembly 38B. As a result, the drive shaft assemblies 46A and 46B, when so positioned, are rotatably engaged with the pulley assemblies 38A and 38B. In addition, as seen in FIG. 6, each drive shaft assembly 46A and 46B includes a central bore 64 in the hex shaped portion 60 in which is received a captive spring 66. Each hex housing 56 includes a cylindrically shaped central member 68. When each drive shaft assembly 46A and 46B is assembled, the captive spring 66 is received over the central member 68 as shown in FIG. 6. The configuration of the central bore 64, the captive spring 66 and the central member 68 causes each shaft 54 to be biased upwardly to a position wherein the splines are engaged as just described (each shaft 54 is restrained axially by a spiral ring 70 provided on the bottom portion of the shaft 54). That same configuration also enables the shaft 54 to be moved downwardly within and with respect to the hex housing 56 when a downward force is applied to the shaft 54, thereby compressing the captive spring 66. The significance of this functionality is described below. Furthermore, the hex fit/engagement between the hex shaped portion 60 of each shaft 54 and the hex shaped top opening of each hex housing 56 causes those two components to be rotatably engaged to one another so that they rotate together (within a drive sleeve 48A, 48B).

Figure 8:
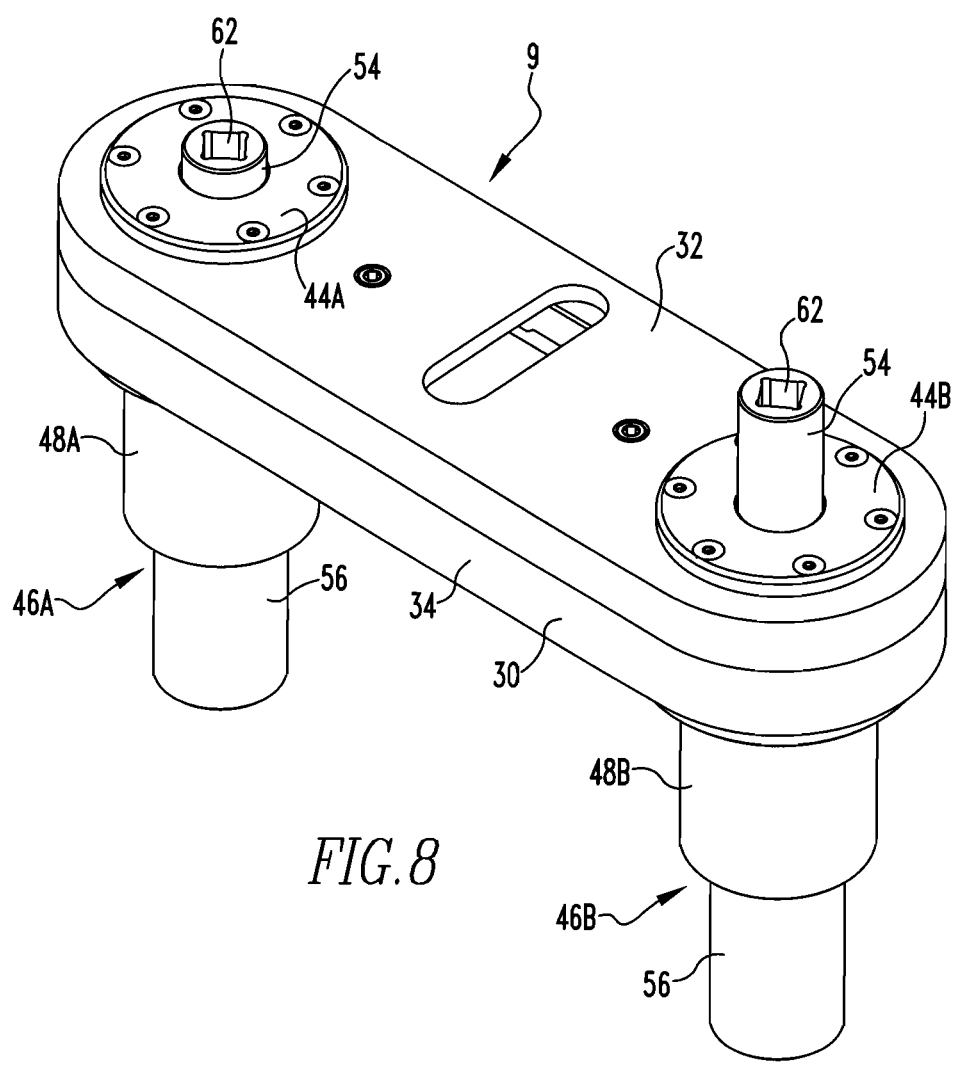
FIG. 8 is an isometric view of the drive assembly of FIGS. 4, 5 and 6 wherein one of the drive shaft assemblies thereof is in a disengaged position.

As described above, when the shaft 54 of a drive shaft assembly 46A, 46B is in the upward, biased position (see FIGS. 4 and 6), the shaft 54 is coupled to the associated pulley assembly 38A, 38B via the spline engagement, and therefore the drive shaft assembly 46A, 46B is coupled to the belt and pulley system 36. Thus, if both drive shaft assemblies 46A and 46B are in this upwardly biased (engaged) position, rotating/driving one drive shaft assembly 46A, 46B (for example by using an air wrench coupled to the recess 62 of the shaft 54 thereof) will cause the other drive shaft assembly 46A, 46B to also be rotated through operation of belt and pulley system 36. Furthermore, either drive shaft assembly 46A, 46B can be disengaged from belt and pulley system 36 by applying a downward pressure to the shaft 54 thereof, which causes the shaft 54 to be moved downwardly and disengages the external spline 58 from the internal spline of the associated pulley assembly 38A, 38B (see FIG. 8). Once either drive shaft assembly 46A, 46B is disengaged in this manner, it can rotate independently of the other drive shaft assembly 46A, 46B, and thus may be driven independently (for example by using an air wrench coupled to the recess 62 of the shaft 54 thereof). When driven, each drive shaft assembly 46A, 46B rotates within the associated drive sleeve 48A, 48B.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the breath of the appended claims and any and all equivalents thereof.

What is claimed is:

1. A dual drive winch assembly, comprising:
 a first winch drum;
 a second winch drum; and
 a drive assembly, the drive assembly comprising:
  a first drive shaft assembly having a first shaft, the first drive shaft assembly being operatively coupled to the first winch drum for driving the first winch drum;
  a second drive shaft assembly having a second shaft, the second drive shaft assembly being operatively coupled to the second winch drum for driving the second winch drum; and
  a coupling mechanism;
 wherein the first shaft is selectively movable within the first drive shaft assembly between a first engaged position wherein the first shaft is coupled to the coupling mechanism and a first disengaged position wherein the first shaft is not coupled to the coupling mechanism, wherein the second shaft is selectively movable within the second drive shaft assembly between a second engaged position wherein the second shaft is coupled to the coupling mechanism and a second disengaged position wherein the second shaft is not coupled to the coupling mechanism, and wherein when the first shaft is in the first engaged position and the second shaft is in the second engaged position simultaneously, rotation of one of first shaft and the second shaft will, through the coupling mechanism, cause rotation of the other of the first shaft and the second shaft.

2. The dual drive winch assembly according to claim 1, wherein the first shaft is normally biased in the first engaged position within the first drive shaft assembly and moves to the first disengaged position in response to a first force in opposition to the biasing being applied to the first shaft, and wherein the second shaft is normally biased in the second engaged position within the second drive shaft assembly and moves to the second disengaged position in response to a second force in opposition to the biasing being applied to the second shaft.

3. The dual drive winch assembly according to claim 2, wherein the first drive shaft assembly further includes a first housing, the first shaft being received and movable within the first housing, and wherein the second drive shaft assembly further includes a second housing, the second shaft being received and movable within the second housing.

4. The dual drive winch assembly according to claim wherein the first shaft has a first central bore, wherein the first housing has a first central member, wherein the first drive shaft assembly includes a first spring having a first portion provided within the first central bore and a second portion provided over the first central member, wherein the first spring normally biases the first shaft in the first engaged position, wherein the second shaft has a second central bore, wherein the second housing has a second central member, wherein the second drive shaft assembly includes a second spring having a first portion provided within the second central bore and a second portion provided over the second central member, and wherein the second spring normally biases the second shaft in the second engaged position.

5. The dual drive winch assembly according to claim 1, wherein the coupling mechanism comprises a belt and pulley system having a first pulley assembly, a second pulley assembly, and belt provided between the first pulley assembly and the second pulley assembly, the belt coupling the first pulley assembly and the second pulley assembly to one another.

6. The dual drive winch assembly according to claim 5, wherein in the first engaged position the first shaft is coupled to the first pulley assembly, wherein in the first disengaged position the first shaft is not coupled to the first pulley assembly, wherein in the second engaged position the second shaft is coupled to the second pulley assembly, and wherein in the second disengaged position the second shaft is not coupled to the second pulley assembly.

7. The dual drive winch assembly according to claim 6, wherein the first shaft has a first external spline portion and the first pulley assembly has a first internal spline portion, wherein in the first engaged position the first external spline portion engages the first internal spline portion, wherein in the first disengaged position the first external spline portion does not engage the first internal spline portion, wherein the second shaft has a second external spline portion and the second pulley assembly has a second internal spline portion, wherein in the second engaged position the second external spline portion engages the second internal spline portion, and wherein in the second disengaged position the second external spline portion does not engage the second internal spline portion.

8. The dual drive winch assembly according to claim 6, further comprising a housing, wherein the first pulley assembly, the second pulley assembly, and the belt are provided within the housing.

9. The dual drive winch assembly according to claim 1, wherein a top end of the first shaft has a first recess and a top end of the second shaft has a second recess.

10. A nuclear reactor maintenance apparatus for selectively raising and lowering a component of the nuclear reactor, comprising:
an interface assembly coupled to the component;
a first cable and a second cable each coupled to the interface assembly, the first and second cables being structured to support the component during the raising and lowering of the component; and
a winch assembly, the winch assembly comprising:
a first winch drum, the first cable being coupled to the first winch drum;
a second winch drum, the second cable being coupled to the second winch drum; and
a drive assembly, the drive assembly comprising:
a first drive shaft assembly having a first shaft, the first drive shaft assembly being operatively coupled to the first winch drum for driving the first winch drum;
a second drive shaft assembly having a second shaft, the second drive shaft assembly being operatively coupled to the second winch drum for driving the second winch drum; and
a coupling mechanism;
wherein the first shaft is selectively movable within the first drive shaft assembly between a first engaged position wherein the first shaft is coupled to the coupling mechanism and a first disengaged position wherein the first shaft is not coupled to the coupling mechanism, wherein the second shaft is selectively movable within the second drive shaft assembly between a second engaged position wherein the second shaft is coupled to the coupling mechanism and a second disengaged position wherein the second shaft is not coupled to the coupling mechanism, and wherein when the first shaft is in the first engaged position and the second shaft is in the second engaged position simultaneously, rotation of one of the first shaft and the second shaft will, through the coupling mechanism, cause rotation of the other of the first shaft and the second shaft.

11. The nuclear reactor maintenance apparatus according to claim 10, wherein the first shaft is normally biased in the first engaged position within the first drive shaft assembly and moves to the first disengaged position in response to a first force in opposition to the biasing being applied to the first shaft, and wherein the second shaft is normally biased in the second engaged position within the second drive shaft assembly and moves to the second disengaged position in response to a second force in opposition to the biasing being applied to the second shaft.

12. The nuclear reactor maintenance apparatus according to claim 11, wherein the first drive shaft assembly further includes a first housing, the first shaft being received and movable within the first housing, and wherein the second drive shaft assembly further includes a second housing, the second shaft being received and movable within the second housing.

13. The nuclear reactor maintenance apparatus according to claim 12, wherein the first shaft has a first central bore, wherein the first housing has a first central member, wherein the first drive shaft assembly includes a first spring having a first portion provided within the first central bore and a second portion provided over the first central member, wherein the first spring normally biases the first shaft in the first engaged position, wherein the second shaft has a second central bore, wherein the second housing has a second central member, wherein the second drive shaft assembly includes a second spring having a first portion provided within the second central bore and a second portion provided over the second central member, and wherein the second spring normally biases the second shaft in the second engaged position.

14. The nuclear reactor maintenance apparatus according to claim 10, wherein the coupling mechanism comprises a belt and pulley system having a first pulley assembly, a second pulley assembly, and belt provided between the first pulley assembly and the second pulley assembly, the belt coupling the first pulley assembly and the second pulley assembly to one another.

15. The nuclear reactor maintenance apparatus according to claim 14, wherein in the first engaged position the first shaft is coupled to the first pulley assembly, wherein in the first disengaged position the first shaft is not coupled to the first pulley assembly, wherein in the second engaged position the second shaft is coupled to the second pulley assembly, and wherein in the second disengaged position the second shaft is not coupled to the second pulley assembly.

16. The nuclear reactor maintenance apparatus according to claim 15, wherein the first shaft has a first external spline portion and the first pulley assembly has a first internal spline portion, wherein in the first engaged position the first external spline portion engages the first internal spline portion, wherein in the first disengaged position the first external spline portion does not engage the first internal spline portion, wherein the second shaft has a second external spline portion and the second pulley assembly has a second internal spline portion, wherein in the second engaged position the second external spline portion engages the second internal spline portion, and wherein in the second disengaged position the second external spline portion does not engage the second internal spline portion.

17. The nuclear reactor maintenance apparatus according to claim 15, further comprising a housing, wherein the first pulley assembly, the second pulley assembly, and the belt are provided within the housing.

18. The nuclear reactor maintenance apparatus according to claim 10, wherein a top end of the first shaft has a first recess and a top end of the second shaft has a second recess.

19. The nuclear reactor maintenance apparatus according to claim 10, wherein the interface assembly includes a bucket for supporting the component, a cable turning block coupled to the bucket, and first and second assemblies coupled to a second component of the nuclear reactor associated with the component, wherein the first and second cables are coupled to the first assembly and fed through the cable turning block and the second assembly to the first winch drum and the second winch drum, respectively.

* * * * *